April 26, 1966  N. V. LASKEY ETAL  3,247,822
DESIGN OF TANK VESSELS
Filed Nov. 29, 1963  6 Sheets-Sheet 4

INVENTORS
G.T.R. CAMPBELL
N.V. LASKEY
Fetherstonhaugh & Co.
ATTORNEYS

United States Patent Office 3,247,822
Patented Apr. 26, 1966

3,247,822
DESIGN OF TANK VESSELS
Norman V. Laskey, St. Lambert, Quebec, and George T. R. Campbell, Montreal, Quebec, Canada, assignors to Algonquin Shipping and Trading Limited, Montreal, Quebec, Canada
Filed Nov. 29, 1963, Ser. No. 326,668
Claims priority, application Canada, Dec. 15, 1962, 864,662
5 Claims. (Cl. 114—74)

This invention relates to improvements in the design of oil tank vessels and particularly in the overall design whereby a marked economy in construction and operation of such vessels is obtained as compared with vessels of approximately comparable size. This economy is first obtained by a significant reduction in the light ship weight of the vessel, brought about first, by a large reduction in the number of oil cargo carrying tanks, second, by the design of the fore body of the vessel and third, by utilizing the funnel of the vessel for accommodation and for the navigation and control space such as bridge, wheelhouse, chart room and radio room.

It has been the practice, up until the present time, to provide a large number of individual oil cargo tanks defined by a series of transverse bulkheads intersected by at least two longitudinal bulkheads, all of which bulkheads add up to a large proportion of the light ship weight. In addition, each of these individual oil cargo tanks was served with its own piping system whereby each tank could be loaded and emptied from a deck control post. The weight of such pipes, and the control valves and pumping equipment associated therewith also added considerably to the light ship weight.

The present invention consists essentially in that, treating the vessel as a rectangular beam and giving it a lower length/depth ratio or in other words a large depth in relation to its length, greater resistance against failure when loaded will result. The advantage of this is that with the greater depth, the material used for constructing the upper or strength deck and the shell at bottom, which are the most highly stressed members of a ship's hull girder, can be reduced in thickness while the value of section modulus will remain identical with that of a vessel having a greater length/depth ratio. In addition to the lower length/depth ratio of the vessel of this application, the configuration of the reduced number of oil tanks has been simplified, contributing to a further reduction in the quantity of steel required to construct the vessel. Advantage has also been taken of the simplified tank loading and discharge system set forth in our co-pending patent application Serial No. 282,665 and our co-pending patent application Serial No. 299,901, relating to vessels having a large block coefficient, to further reduce the weight of the vessel and increase its operating efficiency.

The object of the invention is to improve the design of a vessel whereby a material saving in construction and operating costs are achieved.

A further object of the invention is to provide a cargo oil tank vessel having a greatly reduced number of cargo tanks.

A further object of the invention is to so design and construct the individual cargo tanks as to reduce the quantity of steel required.

A further object of the invention is to associate the reduced number of cargo oil tanks with corresponding reduction in the cargo loading and discharge equipment.

A further object of the invention is to reduce the number of cargo oil tanks and so effect a reduction in the heating coil system.

A further object of the invention is to reduce the area of tank surfaces and, as a consequence, reduce the cost of tank cleaning and also the cost of repair and renewal of divisional bulkheading.

These and other objects of the invention will be apparent from the following detailed specification and accompanying drawings, in which.

Figure 1:
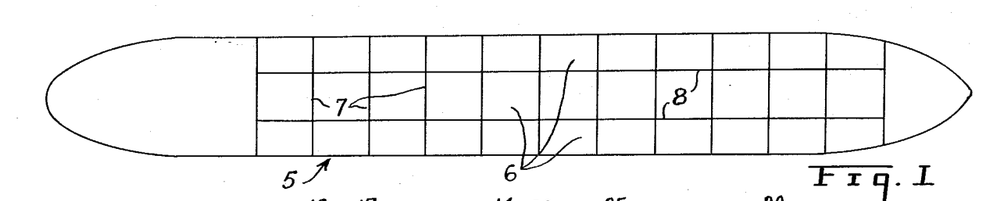
FIG. 1 is a skeleton plan view of a cargo oil tank vessel having a large number of individual oil cargo tanks.

Referring to the drawings. In FIG. 1 there is shown in skeleton form a plan view of an oil tank vessel 5 having a series of thirty-three individual oil tanks 6, divided by transverse bulkheads 7 and intersected by two longitudinal bulkheads 8. In a vessel of this type, the object has been to limit the fore and aft length of any one tank compartment to 40′-0″ as a maximum. By so doing the floodable length, in the event of shell damage, could be readily controlled and the possibility of the vessel floundering is greatly reduced. The great drawback to this type of construction is that the transverse bulkheads 7 and the longitudinal bulkheads 8 add considerably to the light ship weight of the vessel. In addition, vessels of the type shown in FIG. 1 usually had a block coefficient not exceeding 0.80 which has been considered in the past to be the upper limit for block coefficient to which a deep sea vessel could be built in order to return what is considered to be an economical sea speed of 17 knots.

With vessels of the type shown in FIG. 1 it has also been the practice to service each individual tank 6 with its own suction piping and associated control valves. This has also added to the light ship weight of the vessel.

Figure 2:
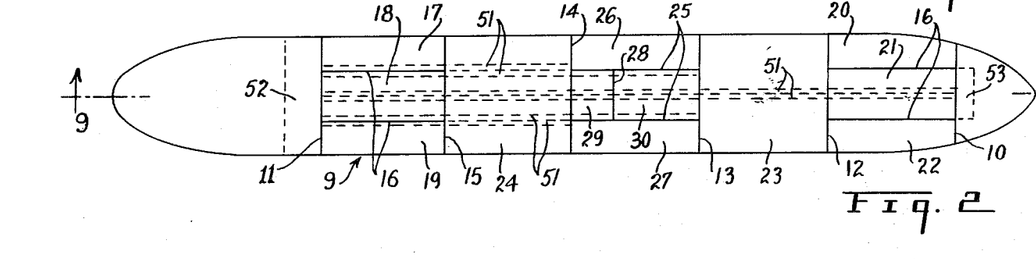
FIG. 2 is a plan view similar to FIG. 1 but showing a fewer number of cargo tanks disposed according to the present invention.
Figure 3:
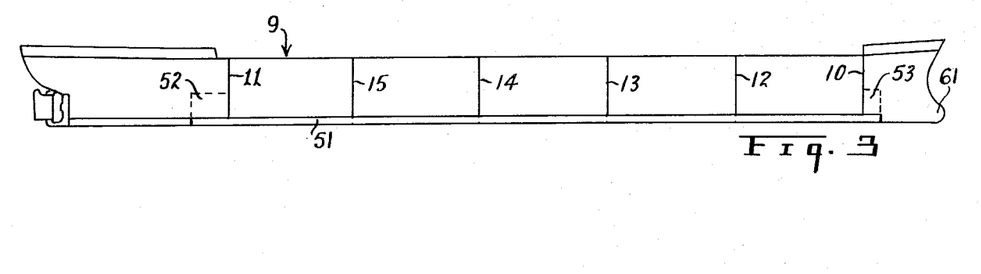
FIG. 3 is a skeleton longitudinal elevation of the vessel shown in FIG. 2.

In FIGS. 2 and 3 there is shown in skeleton form the layout of an oil cargo tank vessel according to the present invention. In the vessel 9 the space between the fore bulkhead 10 and the aft bulkhead 11 is divided by only four transverse bulkheads 12, 13, 14 and 15. The space between the transverse bulkheads 11 and 15 is divided by the longitudinal bulkheads 16 to form three cargo oil tanks 17, 18 and 19. Similarly the space between the transverse bulkheads 10 and 12 is divided by longitudinal bulkheads 16 to form three cargo oil tanks 20, 21 and 22. The spaces between the transverse bulkheads 12 and 13 form a single oil storage tank 23 and the space between the bulkheads 14 and 15 also forms a single storage tank 24. The space between the transverse bulkheads 13 and 14 is divided by the longitudinal bulkheads 25 to form permanent wing ballast tanks 26 and 27, while the space between the longitudinal bulkheads 25 is divided by a transverse bulkhead 28 to form a permanent control ballast tank 29 and a cargo oil tank 30.

Referring now to FIGS. 9 to 13 inclusive which show in detail the construction of the various bulkheads and associated structure by means of which the objects of the present invention are accomplished.

Figure 9:
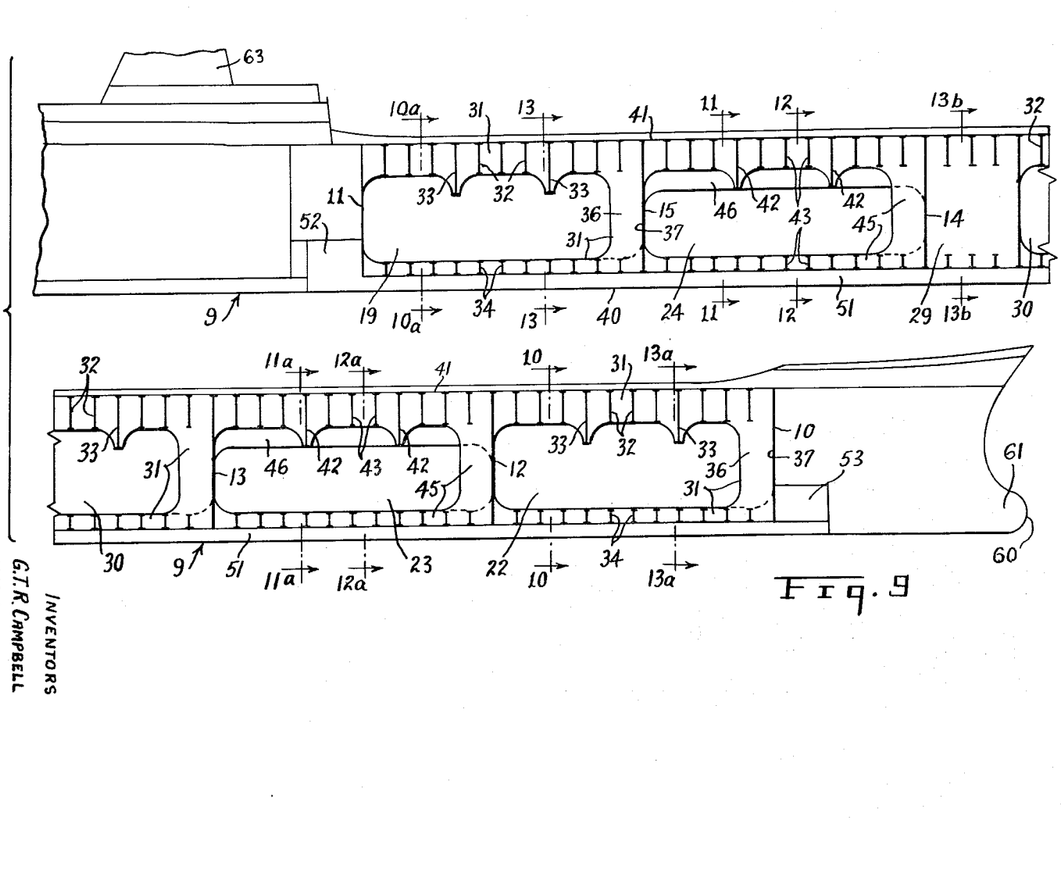
FIG. 9 is an enlarged longitudinal section taken on the line 9—9 of FIG. 2.
Figure 10:
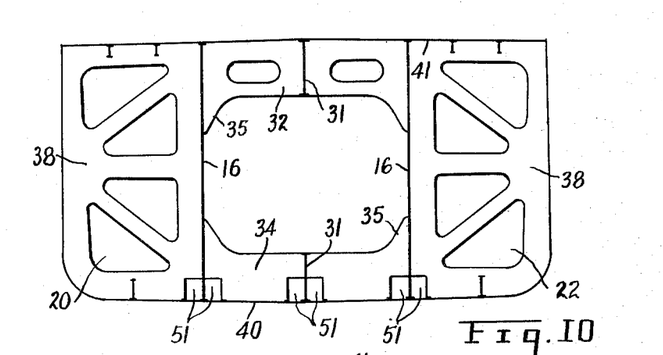
FIG. 10 is a transverse section of the vessel taken on the line 10—10 of FIG. 9.
Figure 13:
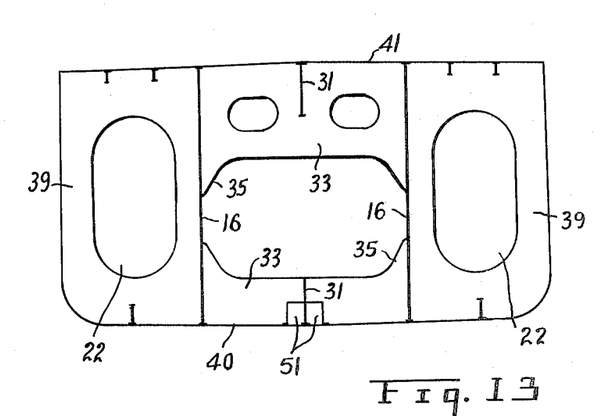
FIG. 13 is a transverse section of the vessel taken on the line 13—13 of FIG. 9.

FIG. 10 is a transverse section through oil storage tanks 20, 21 and 22 and is typical of the section through tanks 17, 18 and 19 taken at the line 10a—10a. The structure shown in FIG. 10 is applied at 10-foot intervals except at 40 or 50 foot intervals, depending on Classification Society requirements, the section takes the form shown in FIG. 13. FIG. 13 is typical of the section on the line 13a—13a, FIG. 9, through tanks 17, 18 and 19 and on the line 13b—13b through tank 26, 29-30 and 27.

As will be seen in FIG. 9 the central longitudinal girder 31 is here shown as a plate girder, intersecting the upper transverse girders 32 and 33 and the lower transverse girders 34 spanning the space between the longitudinal bulkheads 16 in the case of tanks 17, 18, 19 and 20, 21 and 22 and between the longitudinal bulkheads 25 in the case of the tanks 26, 28–29 and 27. The girder 31 is cut out to align with the lower edges of the transverse girders 32 and 33 and with the upper edges of the lower transverse girders 34. The transverse girders 33 and 42 are suitably deepened to provide a fore and aft wash plate effect and thus prevent synchronous oscillation of the large bulk of fluid in the tank when the vessel is pitching in a seaway. Similarly, the longitudinal girder 31 at its forward end is deepened at 36 to stiffen the transverse bulkheads 10, 12, 13, 14 and 15.

The wing tanks 17–19, 20–22 and 26–27, are provided with transverse plate girders 38, FIG. 10, at 10-foot intervals and with the plate girders 39, FIG. 13, at 40–50 foot intervals, depending on Classification Society requirements. These plate girders span the space between the adjacent longitudinal bulkheads 16 and 25 and the shell 40 and the deck plates 41 of the vessel.

Figure 11:
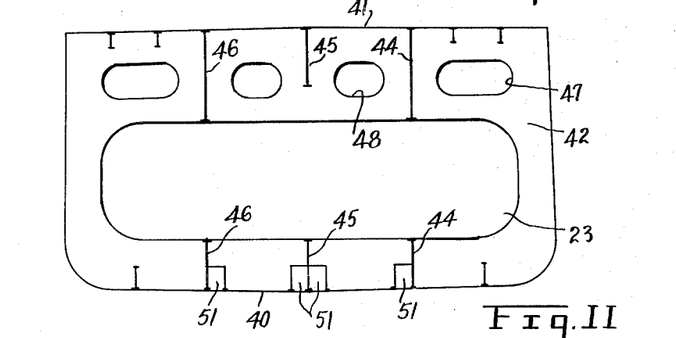
FIG. 11 is a transverse section of the vessel taken on the line 11—11 of FIG. 9.
Figure 12:
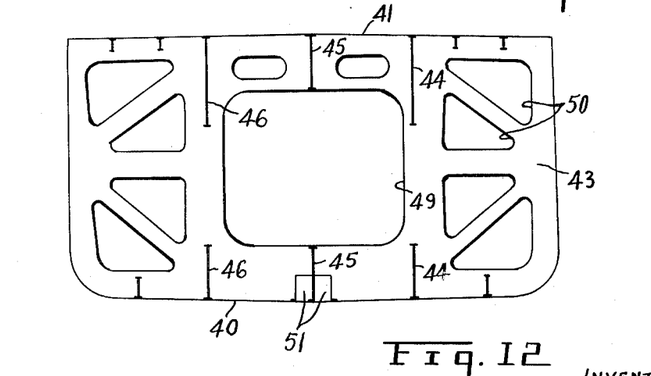
FIG. 12 is a transverse section of the vessel taken on the line 12—12 of FIG. 9.

In the tanks 23 and 24 the transverse plate girders 42, see FIG. 11, are located at 40–50 foot intervals, depending on Classification Society requirements, while the transverse plate girders 43, see FIG. 12, are located at 10-foot intervals. These plate girders 42 and 43 intersect the longitudinal girders 44, 45 and 46. The central longitudinal girder 45 is aligned with the longitudinal girder 31 in adjacent tanks while the outer longitudinal girders 44 and 46 are aligned with the longitudinal bulkheads 16 and 25 in adjacent tanks and together form with the shell 40 and the deck plates 41, a rectangular girder extending the full length of the vessel.

The plate girders 42, FIG. 11, are provided with cutouts at 47 and 48, while the plate girders 43 are provided with cutouts 49 and 50 to provide comuunication along the length of the tanks and at the same time minimize surge of the oil cargo lengthwise of the vessel. The longitudinal girders 44, 45 and 46 also minimize surge of the oil cargo transversely of the vessel.

In order to service each of the cargo oil tanks a series of longitudinal trunks 51 extend forwardly from the aft pump room 52. The trunks 51 located on the longitudinal centre line of the vessel may also extend to the forward pump room 53 if such is provided. The trunks 51 are constructed on either side of the longitudinal girder 45 at centre line at bottom of vessel and at the base of the longitudinal bulkheads 16 and 25 and longitudinal girders 46 as shown on FIGS. 2, 10, 11 and 12 and therefore contribute to the longitudinal strength of the vessel in resisting the bending moments induced in the structure when the vessel is operating in waves.

The purpose of these trunks 51 is to provide distribution reservoirs to each of the individual cargo oil tanks and are provided with suitable ditribution control valves as fully set forth in our co-pending patent application Serial No. 282,665.

In our co-pending application Serial No. 282,665 the total amount and size of piping extending throughout the vessel and particularly in cargo holds and tanks, is greatly reduced thereby contributing to a reduction in weight and economy in construction costs.

A vessel constructed as above described is designed for a block coefficient of 0.835 as against a block coefficient of 0.80 or as employed in larger and wider vessels, in the manner set forth in our co-pending patent application Serial No. 299,901.

Figure 4:
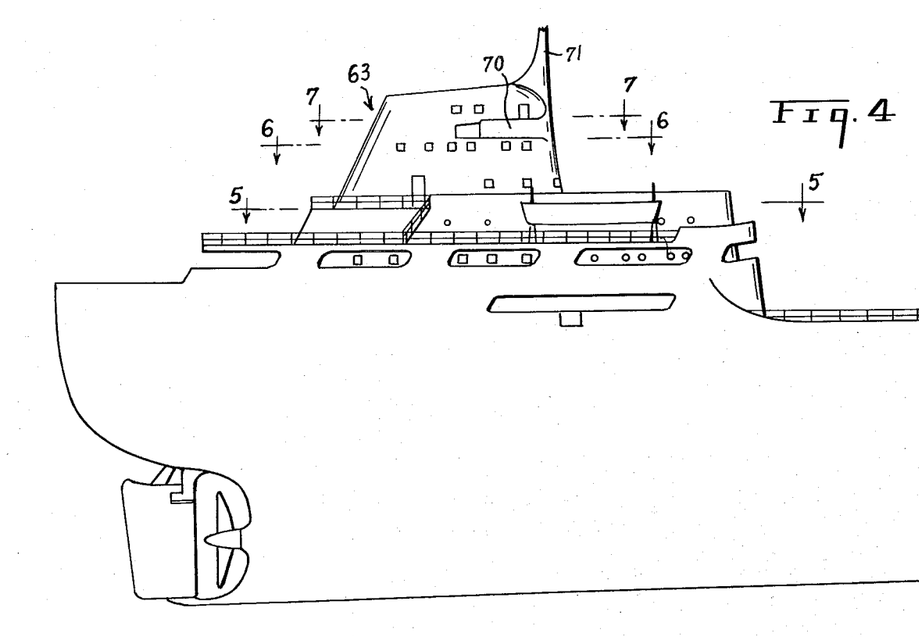
FIG. 4 is an enlarged elevation of the after end of the vessel shown in FIG. 2.
Figure 5:
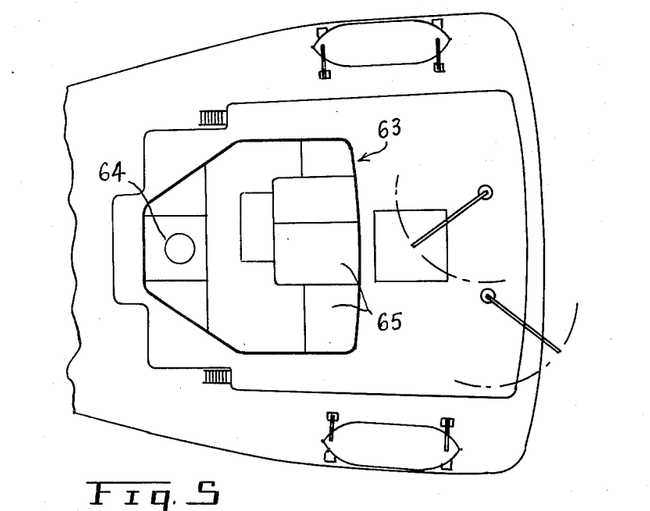
FIG. 5 is a plan view of the after end of the vessel taken on the line 5—5 of FIG. 4.
Figure 6:
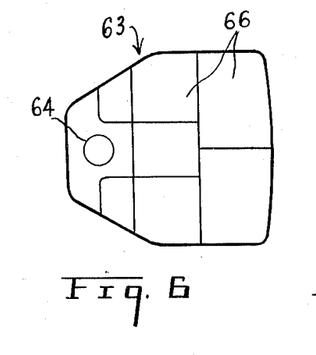
FIG. 6 is a plan view taken on the line 6—6 of FIG. 4.
Figure 7:
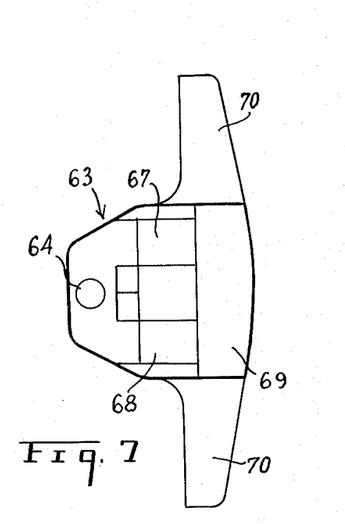
FIG. 7 is a plan view of bridge level taken on the line 7—7 of FIG. 4.
Figure 8:
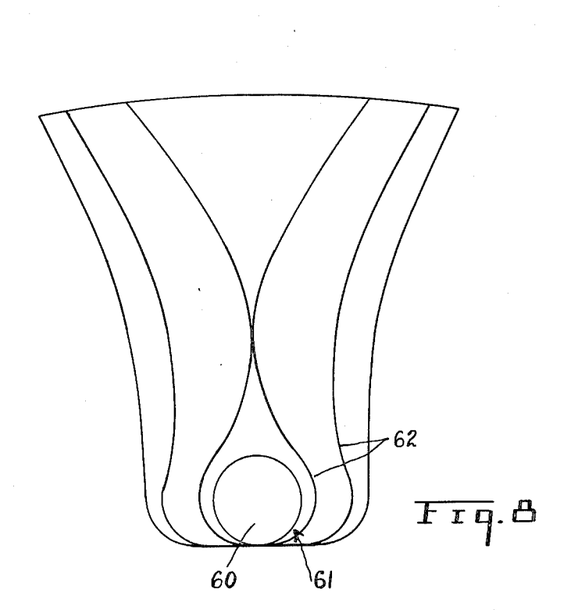
FIG. 8 is a front elevation of the bow of the vessel shown in FIG. 2.

In our co-pending application Serial No. 299,901 the higher block coefficient of 0.835 is obtained by the design of the fore foot of the hull of a bluff form hull after the manner shown in FIG. 8 of the present application. In FIGS. 3, 4 and 8 the hull 9 is provided with an appendage 60 projecting forwardly. The forward surface 60 of the appendage 61 is spherical in form and is moulded into the surface of the bluff hull form by lines 62 of varying radii.

Further improvement in the economy of construction of the vessel is obtained by utilizing the funnel 63 of the vessel in the manner shown in FIGS. 4 to 7 inclusive. The lower level of the funnel 63, FIG. 5, in addition to providing space for the engine exhaust pipe 64 has accommodation spaces 65. At the level 6—6, FIG. 6, there is the gas discharge pipe 64 and additional accommodation 66, while at the level 7—7, FIG. 7, there is the space for the gas discharge pipe 64, chart room 67, radio room 68 and wheelhouse 69. The wings 70 of the bridge, extend transversely of the funnel 63. The ship mast 71 extends upwards from the bridge level at the front of the funnel 63.

In order to set forth the advantages of a vessel designed according to the present invention, comparative examples of two vessels are given below.

*Vessel A.—(Orthodox oil tank vessel of the type shown in FIG. 1)*

| | |
|---|---|
| Length (between perpendiculars) | 745'-0" |
| Breadth (moulded) | 106'-0" |
| Depth (moulded) | 52'-0" |
| Draft (extreme) | 38'-0" |
| Draft (assignable summer freeboard) | 47'-0" |
| Block coefficient | 0.80 |
| Displacement __________long tons | 68,591 |
| Light ship weight __________do | 16,591 |
| Deadweight __________do | 52,000 |
| Speed when propulsion unit develops 18.500 S.H.P. __________knots | 17 |

*Vessel B.—(Oil tank vessel designed in accordance with the design precept of the present invention)*

| | |
|---|---|
| Length (between perpendiculars) | 727'-0" |
| Breadth (moulded) | 101'-7" |
| Depth (moulded) | 55'-0" |
| Draft (extreme) | 38'-0" |
| Draft (assignable summer freeboard) | 42'-0" |
| Block coefficient | 0.835 |
| Displacement __________long tons | 66,962 |
| Light ship weight __________do | 13,462 |
| Deadweight __________do | 53,500 |
| Speed when propulsion unit develops 18.500 S.H.P. __________knots | 17 |

NOTE: Light ship weight is the displacement of the vessel in tons as completed by the builders ready for sea but without stores, spare gear, fresh water, wash water and fuel oil. Deadweight is the difference between full load displacement in tons at the assigned Summer Freeboard Draft and the light ship weight in tons.

The pertinent features of the comparison of Vessels A and B are as undernoted:

(a) Vessel B is a shorter and narrower vessel but deeper. It carries a deadweight of 53,500 tons as opposed to 52,000 tons carried by the longer and wider Vessel A, at a draft of 38′–0″. The reason why Vessel B, which has smaller physical dimensions carries a higher deadweight is because the light ship weight is lower by 3129 tons while the block coefficient employed is 0.835 against 0.80 in the longer and wider Vessel A. These two design parameters offset the advantage of the high displacement at the designed load draft of 38′–0″ on the longer and and wider vessel.

(b) It will be noticed that the length/depth ratio in Vessel A is 15:1 while in Vessel B the length/depth ratio is 13.2:1. In other words Vessel B is deeper in proportion to its length than Vessel A.

It is a well known fact that the section modulus of a rectangular beam is given by the expression $$\frac{bd^2}{6}$$

where "$b$" is the breadth and "$d$" the depth. Section modulus is a geometric property of a structure section which is used as a parameter for determining the loading of a beam can be subjected to in respect to the safe working stress in the material of a beam.

The expression is therefore $$\text{Bending moment} = \frac{bd^2}{6} \times \text{safe working stress}$$

The application of this expression to Vessels A and B
Vessel A:

$$\text{Bending moment} = \frac{106 \times 52^2}{6} \times \text{safe working stress}$$

Vessel B:

$$\text{Bending moment} = \frac{101.5833 \times 55^2}{6} \times \text{safe working stress}$$

As the longitudinal strength of a ship is assessed in a similar manner to that of a rectangular beam it is obvious that the vessel which has a lower length/depth ratio, or in other words a large depth in relation to its length, will offer a greater resistance against failure when loaded. The advantage of this is that with the greater depth, the material to be used for constructing the upper or strength deck and the shell at bottom, which are the most highly stressed members of a ship's hull girder, can be reduced in thickness in Vessel B which has a length/depth ratio of 13.2:1 while the value of section modulus will remain identical with that in Vessel A with a length/depth ratio of 15:1. This is one of the contributory reasons why a saving in weight occurs but with this particular comparison a more important reason why a large saving in light ship weight accrues is because Vessel B is shorter and considerably narrower than Vessel A.

While a specific length/depth ratio of 13.2:1 has been given in respect of the example Vessel B, the 13.2 is considered to be the highest economical value for a sea going vessel of the type described. However, for inland vessels sailing in relatively sheltered waters, the length/depth ratio could be as high as 16:1. Similarly, a block coefficient of 0.835 is given for the example Vessel B. Vessel meeting the design precepts of the present invention could have a block coefficient of between 0.81 and 0.85.

The prime reason why the light ship weight of Vessel B is lower, by 3129 tons, than Vessel A is because the configuration of oil tanks in Vessel B has been simplified and this greatly reduces the quantity of steel necessary to construct the vessel. This is the salient feature of the invention.

It is obvious that the greater draft allowable in tank vessels subdivided in the orthodox manner as shown in FIG. 1 cannot be achieved in a vessel subdivided as shown in FIGS. 2 and 3, as the floodable length of the individual tanks between the transverse oil tight and water tight bulkheads is far in excess of the 40-foot limitation on fore and aft length of an oil tank and therefore a vessel subdivided as in FIGS. 2 and 3 could not be assigned a freeboard draft similar to that assigned a vessel subdivided as in FIG. 1.

However, a tank vessel subdivided as in FIGS. 2 and 3 and having a hull form having a block coefficient of 0.835 built in accordance with the design precepts set forth in our co-pending patent application Serial No. 299,901 can return an appreciable gain in deadweight over and above that which would be obtained in an orthodox tanker vessel of similar dimensions besides which the weight will be considerably reduced by the elimination of the extensive bulkheading in way of the cargo oil tanks. This gain in deadweight capacity has the added advantage that the increased capacity is carried at reduced draft.

The Tubular Freeboard for a tanker 727′–0″ in length is 125.2 inches while the Freeboard for a dry cargo vessel of similar length is 157.40 inches. The difference in draft, assuming that the factors involved in the geometry affecting freeboard assignment are identical, will result in the vessel being assigned a draft 2′–8.2″ deeper than than that assignable to the dry cargo vessel.

Assuming a tank vessel of similar dimensions to Vessel B given above, with a block coefficient of 0.80 but with a draft of 40′–8.2″, which represents a tanker freeboard draft. The displacement of this vessel will be 68,591 long tons while the light ship weight will be 16,591 long tons and the deadweight 52,000 long tons.

In the tanker Vessel B having a block coefficient of 0.835 and built in accordance with the present invention and with co-pending patent application Serial No. 299,901 the displacement would be 66,962 long tons at a draft of 38′–0″ which is computed on the basis of freeboard draft assigned for a dry cargo vessel. As the light ship weight of the vessel is 13,462 tons the deadweight will be 53,500 tons. The gain in deadweight is therefore 1500 tons.

The difference of 3129 tons in the light ship weight as between a Vessel B having a block coefficient of 0.80 and a Vessel B having a block coefficient of 0.835 can be directly apportioned to the saving in steel used in constructing the hull and the outfitting for the simple reason that the propulsion units would be identical in both vessels.

Economy of operation is also obtained in the cleaning of the tanks, for example, Vessel A above described has approximately 349,187 square feet of tank surface which has to be cleaned by Butterworthing Machines, while Vessel B built in accordance with the design precept of this invention, has 317,268 square feet of tank surface.

It is obvious that the labour cost in cleaning and gas freeing the tank will be considerably reduced. This reduction in labour cost associated with tank cleaning is also reflected in a reduction in the fuel cost while the vessel is at sea. The reason for this is because steam generated by the ship's boilers is used to heat the sea water used by the Butterworthing Machines.

It is also a well known fact that premature wastage of divisional bulkhead plating within oil tanks of an orthodox tanker is a recurring source of expensive repair. By eliminating a large percentage of the divisional bulkheading the cost of repair and renewal is naturally reduced.

This invention, in respect to the elimination of a large amount of bulkheading in way of the cargo oil tanks, can be utilized in existing tankers when large scale bulkhead renewals become necessary.

As the transverse bulkheads are spaced at regular intervals of forty or fifty feet, the wasted bulkheads can be cropped in a fashion so as to retain a structural configuration of partial bulkheads similar to those shown in FIGS. 10 to 13 and the intact tank length increased from 40′–0″ to 120′–0″. The vessel would then have to be assigned a freeboard draft similar to that on a dry bulk carrier. This will result in a decrease in the deadweight carrying capacity of the vessel in oil but would provide the ship owner with an ideal vessel for the carriage of bulk grain.

Alternatively, the fore body of the vessel can be rebuilt to incorporate the appendage 61 as shown in FIGS. 3, 4 and 8. The vessel would then show a slight gain in deadweight capacity with the added advantage that the increased capacity is carried at a reduced draft. The operating draft of a tank vessel as already stated is a very important factor especially in large vessels as many parts of the world have a very stringent restriction in navigable draft. In regard to the problem of reduction in draft which is accompanied by an increase in the freeboard, it is mentioned that freeboard is one of the most important parameters when assessing the seakeeping characteristics of a vessel. The vessel with the reduced draft, owing to the elimination of the bulkheads in accordance with the design precept of this invention, will produce a more consistent average sea speed than would the deeper draft vessel.

It should be noted that the oil tank configuration, shown in FIG. 2, which is one of the main features of the present invention, can be applied to any size of oil tank vessel, provided the freeboard is assigned to it on a similar basis to that of a dry cargo vessel and provided there remains a safe margin on the transverse stability after the "free surface" correction is made for all cargo oil tanks.

The partial longitudinal bulkheads 16 and 25, shown in FIG. 2, can be completely eliminated if so desired, provided the free surface correction without these longitudinal bulkheads does not result in a complete loss in the transverse stability and if some alternative method is provided for correcting port or starboard list in the vessel. Alternatively, a partial longitudinal bulkheading system located in a chosen compartment may be used but positioned along the fore and aft centreline. This would still further reduce the weight of steel but enables any adverse list to be corrected.

At the main deck level 41 it is only necessary to provide twelve cargo oil hatches instead of the thirty-three as required in the orthodox tanker shown in FIG. 1, and a large reduction in the length of piping necessary for venting the cargo oil tanks via the oil tight hatches also obtained.

As the transverse girders or partial bulkheads 34 are spaced at regular intervals approximating the length of the smaller tanks shown in FIG. 1, the length of the tanks can be increased from 40'-0" to 120'-0". The vessel with the long tanks would then be assigned a freeboard draft similar to that of a dry bulk carrier, 157.40 inches. This will result in a decrease in the deadweight carrying capacity of a vessel in oil but would provide the ship owner with an ideal vessel for the carriage of bulk grain.

This invention which is primarily concerned with the simplified, lighter and less costly tank divisional arrangement in a tanker is admirably suited for the adoption of the oil cargo pumping system disclosed in the applicant's copending patent application Serial No. 282,665 and utilizing the trunking 51 shown in the drawings of the present application. It will be appreciated that by making use of the trunking 51, not only is the lower shell greatly strengthened, but the light ship weight is greatly reduced owing to the elimination of the piping and control valves necessary when the large number of tanks, seen in FIG. 1, are individually serviced for loading and discharge of cargo. It will also be appreciated that the trunking 51 does not represent loss of cargo space as all of the trunking between the pump rooms 52 and 53 and the individual tanks form reservoirs for cargo oil.

Considerable saving in cost and weight will also accrue in regard to the oil heating coil system installed in the cargo oil tanks. In an orthodox tanker, each cargo oil tank is provided with a heating coil which is serviced by a steam and exhaust main and drop lines leading down from the main deck. By virtue of the large reduction in the number of cargo oil tanks provided for in the present invention, a considerable saving in the cost of steam heating coils can be achieved. The heating of the oil cargo is based on the principle of a convection current whereby the oil, in close proximity to the heating coil, which is located at the bottom of the tank, is heated. This heating produces a reduction in specific gravity of the oil and thus causes it to rise while the cooler oil which has a higher specific gravity flows downwards towards the heating coil. This cycle of convection current continues as long as steam is supplied to the heating coil in each tank.

It is a well known fact that the larger a tank on board a ship is, a far more satisfactory convection current can be generated, as with a large free surface, the agitation of the oil within the tank, owing to the ship motions, is greater than that which would be obtained in a small tank. This will greatly increase the efficiency of the convection current heating principle and correspondingly there will be a reduction in the quantity of steam supplied to the heating coils in the tanks, or conversely, the heating coil surface area can be reduced. As the steam for this purpose is generated in the ship's boilers the fuel consumed, while the tank heating services are in use, will be reduced.

Finally a further saving in weight and cost of the vessel is achieved by arranging the navigating bridge, wheelhouse, chart room and other accommodation in the funnel as illustrated in FIGS. 4 to 7.

From the above disclosure it will be apparent that a novel and economic design of cargo oil tank vessel has been produced which will have greater resistance to bending in the longitudinal direction combined with increased carrying capacity at reduced draft, and which will require considerable less in the way of loading and discharge equipment which lends itself to reduced operating costs and maintenance.

While the invention has been described primarily in connection with the design of a cargo oil tank vessel it will be apparent that, with the reduction in the number of tanks and increase in their size, that a vessel of the type described is also suitable for carrying bulk dry cargo in a manner which would not be economically possible in an orthodox oil tank vessel having a large number of individual cargo oil tanks as illustrated in FIG. 1.

What we claim is:

1. A cargo vessel comprising an outer shell forming the sides and bottom of the vessel and a main deck; a series of main transverse bulkheads within said shell and said main deck, said main bulkheads spaced to form cargo storage tanks extending substantially the full width of the vessel and which are in excess of forty feet measured lengthwise of the vessel; a series of transverse swash bulkheads in said storage tanks located at spaced intervals longitudinally of said main bulkheads, each transverse swash bulkhead comprising connected top, bottom and sidewall portions to form a unitary structure to continuously support the adjacent side and bottom surfaces of said shell and said main deck and wherein said portions of said transverse swash bulkheads project inwardly from said shell and said main deck, each transverse swash bulkhead having a first central opening; at least one longitudinal swash bulkhead spaced transversely of said main bulkheads, each longitudinal swash bulkhead comprising connected top, bottom and end portions to form a unitary structure to continuously support the adjacent surfaces of said main deck, said bottom of said shell and said main bulkheads of said cargo storage tank, each longitudinal swash bulkhead having a second central opening, said first central opening and said second central opening forming a common central chamber in said cargo storage tank, and wherein said transverse swash bulkheads and said longitudinal bulkheads are secured together at their points of intersection.

2. A cargo vessel as set forth in claim 1 wherein said top portions of said transverse swash bulkheads project downwardly from said main deck a greater distance than the projection inwardly of the sidewall portions from the shell of the vessel.

3. A cargo vessel as set forth in claim 1 wherein openings are provided in at least one of the said top, bottom and side portions of the respective longitudinal and transverse swash bulkheads whereby a restricted quantity of cargo may flow through the said portions of said respective swash bulkheads.

4. A cargo vessel as set forth in claim 1, in which the said longitudinal swash bulkheads have a reduced depth under the main deck in the areas between the transverse swash bulkheads and between the transverse swash bulkheads and the main transverse bulkheads.

5. A cargo vessel as set forth in claim 1, in which one of the said longitudinal swash bulkheads is located on the fore and aft longitudinal centre line of the vessel and one is located intermediate of the said centrally located swash bulkhead and the side of the vessel.

References Cited by the Examiner
UNITED STATES PATENTS

| | | | |
|---|---|---|---|
| 1,234,675 | 7/1917 | Laing et al. | 114—74 |
| 1,699,709 | 1/1929 | Ono | 114—74 |
| 2,077,143 | 4/1937 | Carroll | 114—125 |
| 2,346,505 | 4/1944 | Preuss | 114—74 |
| 2,465,779 | 3/1949 | Ahlbom | 114—74 |
| 2,918,032 | 12/1959 | MacNaught | 114—78 |
| 2,979,009 | 4/1961 | Sorman | 114—74 |

MILTON BUCHLER, *Primary Examiner.*

FERGUS S. MIDDLETON, *Examiner.*

T. M. BLIX, *Assistant Examiner.*